(12) United States Patent
Martin

(10) Patent No.: US 11,970,599 B2
(45) Date of Patent: Apr. 30, 2024

(54) HOLLOW PLASTIC SPHERES WITH CONTROLLED PARTICLE SIZES

(71) Applicant: TRINSEO EUROPE GMBH, Pfaeffikon (CH)

(72) Inventor: Lothar Martin, Buhl (DE)

(73) Assignee: TRINSEO EUROPE GMBH, Pfaeffikon (CH)

( * ) Notice: Subject to any disclaimer, the term of this patent is extended or adjusted under 35 U.S.C. 154(b) by 0 days.

(21) Appl. No.: 18/280,353

(22) PCT Filed: Mar. 4, 2022

(86) PCT No.: PCT/EP2022/055546
§ 371 (c)(1),
(2) Date: Sep. 5, 2023

(87) PCT Pub. No.: WO2022/189290
PCT Pub. Date: Sep. 15, 2022

(65) Prior Publication Data
US 2024/0034864 A1  Feb. 1, 2024

(30) Foreign Application Priority Data

Mar. 8, 2021 (EP) ..................... 21161244

(51) Int. Cl.
*C08F 265/06* (2006.01)
*C08F 265/00* (2006.01)
*C08F 265/02* (2006.01)
*C08F 285/00* (2006.01)
*C08L 23/00* (2006.01)
*C09D 151/00* (2006.01)

(52) U.S. Cl.
CPC ............ *C08L 23/00* (2013.01); *C08F 265/00* (2013.01); *C08L 2201/54* (2013.01); *C08L 2205/02* (2013.01); *C08L 2207/53* (2013.01)

(58) Field of Classification Search
CPC ....... C09D 133/12; C09D 151/00; C08F 2/22; C08F 265/06; C08F 265/02; C08F 285/00
See application file for complete search history.

(56) References Cited

U.S. PATENT DOCUMENTS

| | | |
|---|---|---|
| 3,297,621 A | 1/1967 | Taft |
| 3,787,522 A | 1/1974 | Dickie et al. |
| 4,427,836 A | 1/1984 | Kowalski et al. |
| 4,572,819 A | 2/1986 | Priddy et al. |
| 4,585,825 A | 4/1986 | Wesselmann |
| 4,594,363 A * | 6/1986 | Blankenship ......... C09D 5/028 521/64 |
| 4,666,987 A | 5/1987 | Burmester et al. |
| 5,714,539 A | 2/1998 | Perez et al. |
| 6,020,435 A | 2/2000 | Blankenship et al. |
| 6,075,249 A | 6/2000 | Olson |
| 6,780,820 B2 | 8/2004 | Bobsein |
| 10,005,871 B2 | 6/2018 | Perez et al. |
| 10,030,080 B2 * | 7/2018 | Kim ..................... C08F 293/00 |
| 10,442,882 B2 | 10/2019 | Liu et al. |
| 2002/0193492 A1 | 12/2002 | Wilson |

FOREIGN PATENT DOCUMENTS

| | | |
|---|---|---|
| EP | 0 022 633 A2 * | 1/1981 |
| EP | 0022633 A3 | 7/1981 |
| EP | 2511312 A1 | 10/2012 |
| EP | 3194160 A4 | 3/2018 |
| EP | 4056606 A1 | 9/2022 |
| GB | 1392694 A | 4/1975 |
| GB | 1430902 A | 4/1976 |
| GB | 1527303 A | 10/1978 |
| WO | 2016028512 A1 | 2/2016 |

OTHER PUBLICATIONS

Anderson, Christopher D.et al., "Emulsion Polymerisation and Latex Applications", IBSN 1-85957-381-9 (146 pages), Year: (2003).
Extended European Search Report in co-pending Application No. EP 21 16 1244 dated Sep. 13, 2021 (7 pages).
He, Xiao-Dong et al., "Morphology Control of Hollow Polymer Latex Particle Preparation", Journal of Applied Polymer Science, vol. 98, 860-863 (2005). (4 pages).
International Search Report and Written Opinion issued in co-pending Application No. PCT/EP2022/055546 dated Jun. 3, 2022 (9 pages).
Ji, Wen-jiao et al., "Design and Control of Soap-Free Hydrophilic-Hydrophobic Core-Shell Latex Particles With High Carboxyl Content in the Core of the Particles", Chinese Journal of Polymer Science vol. 30, No. 4 (2012), 595-602 (8 pages).
McDonald, Charles J. et al., "Hollow latex particles: synthesis and applications", Advances in Colloid and Interface Science 99 (2002) 181-213 (33 pages).
Penzel, Erich, "Polyacrylates", 2005 Wiley-VCH Verlag Gmbh & Co. KGaA, Weinheim 10.1002/14356007.a21_157 (24 pages).

* cited by examiner

Primary Examiner — Robert D Harlan
(74) Attorney, Agent, or Firm — Young Basile Hanlon & MacFarlane, P.C.

(57) ABSTRACT

Disclosed are hollow polymer spheres prepared from one or more hydrophilic ethylenically unsaturated monomers containing acid functionality, one or more nonionic hydrophilic ethylenically unsaturated monomers, and one or more hydrophobic ethylenically unsaturated monomers. Disclosed is a process for preparing such hollow spheres. The hollow spheres exhibit controlled particle size, which can have larger particle sizes, narrow particle size distributions and high void volume percentages.

20 Claims, 5 Drawing Sheets

HOLLOW PLASTIC SPHERES WITH CONTROLLED PARTICLE SIZES

CROSS-REFERENCE TO RELATED APPLICATIONS

This application is a National Stage 371 entry of PCT/EP2022/055546 filed on Mar. 4, 2022, published as WO 2022/189290, which claims priority to European Application Number 21161244.5 filed on Mar. 8, 2021, published as EP4056606, both of which are incorporated herein by reference in their entirety for all purposes.

FIELD

Disclosed are hollow polymeric spheres having controlled particle size and narrow particle size distributions. Disclosed are processes for the preparation of hollow polymeric spheres having controlled particle size and narrow particle size distributions. Disclosed is paper having disposed on at least one surface a coating containing such hollow polymeric spheres.

BACKGROUND

Polymer spheres are made via different processes, including from latices prepared by emulsion polymerization. Polymer spheres with voids are known. These spheres include a shell with a voided center. The polymer spheres find application in paper coatings, leather and textile manufacturing and in water-based construction materials. Examples of such systems and methods are disclosed in U.S. Pat. Nos. 4,427,836; 6,020,435; 6,075,249; 6,780,820; 10,442,882; and 10,005,871 and EP Patent Application No. EP0022633 all of which are expressly incorporated herein by reference for all purposes. The polymer spheres with voids find use as binding or opacifying agents used in paints, coatings and molding compositions.

Processes used to prepare some polymer spheres, especially those prepared from highly carboxylated latices, produce significant amounts of residue which present problems in the processing and recovery of the polymer spheres. Many of the known processes are difficult to control and can result in the preparation of polymer spheres with a wide range of particle sizes. The disclosed processes require the preparation of seed latex polymers and the use of the seed latex polymers to form polymeric acid containing core structures and hollow polymer spheres. Some processes involve forming the seed latex polymers and using the seed latex particles to form polymeric acid containing core structures and storing the formed polymeric acid containing core structures which are subsequently utilized to prepare hollow polymeric particles. Commercially, these processes require separate tanks and feed lines to store the seed latex particles, in some cases the polymeric acid containing core structures, and feed the seed latex particles, and in some cases the polymeric acid containing core structures, to a reactor to prepare the hollow polymer spheres. The processes using the seed latex particles can require lengthy polymerization cycles. The known processes have limitations as to the particle size of the spheres, the void volume fraction of the formed spheres and the ability to prepare such particles exhibiting a narrow particle size distribution.

What are needed are hollow spheres with controlled particle size, which can have larger particle sizes, high void volume percentages and low particle size distributions. What are needed are processes for the preparation of hollow spheres which are robust in the sense that the preparation of hollow spheres having desired particle sizes, low particle size standard deviation and which form low residue amounts in the polymerization reactor. What is needed are processes that do not require the use of seed latex particles to polymerize the acid core for the preparation of hollow spheres and the attendant separate tanking and feed lines. What are needed are such processes which are more efficient.

SUMMARY

Disclosed are hollow polymeric spheres prepared from one or more of one or more hydrophilic ethylenically unsaturated monomers containing acid functionality, one or more nonionic hydrophilic ethylenically unsaturated monomers and one or more hydrophobic ethylenically unsaturated monomers. The particles comprise a shell encapsulating a hollow portion which may contain air and the residue of an acid core. The hollow portion lowers density of the particles and provides advantageous properties, such as the ability to function in coatings, as an opacifier or an additive for gloss development, sun screener or thermal insulation. The core may be swollen to swell the shell to increase both the particle size and the volume of the hollow portion. The shell may have one or more layers, two or more layers or three or more layers. If there are more than one layer, the composition of each of the layers may vary across the layer from inside to outside and each layer may have a compositional gradient across the layer from the inside to the outside. The polymeric acid core which defines the original size of the shell before swelling may have a content of the one or more hydrophilic ethylenically unsaturated monomers containing acid functionality as high as possible. The average particle size of the hollow polymeric spheres may be from 200 to 2000 nanometers (nm) as measured by Scanning Electron Microscopy (SEM). The average particle size of the hollow polymeric spheres may be about 200 nm or greater, about 500 nm or greater, about 700 nm or greater, about 1000 nm or greater, about 1200 nm or greater or about 1300 nm or greater. The hollow portion means that there is a portion containing no solid material which may be filled with air. The hollow portion may be about 30 percent or greater of the volume of the hollow polymeric spheres, about 40 percent or greater, about 50 percent or greater or about 60 percent or greater. The particles may contain low amounts of unreacted monomers such as about 1000 ppm or less, about 900 ppm or less, about 800 ppm or less, about 700 ppm or less, about 600 ppm or less, about 500 ppm or less, about 400 ppm or less, about 300 ppm or less or about 200 ppm or less. The emulsion system used to prepare the particles may contain low amounts of filterable residue formed during preparation of the polymers. The polymeric acid core may contain up to 50 percent by weight of one or more hydrophilic ethylenically unsaturated monomers containing acid functionality, up to 40 percent by weight of one or more hydrophilic ethylenically unsaturated monomers containing acid functionality or up to 35 percent by weight of one or more hydrophilic ethylenically unsaturated monomers containing acid functionality. The shell may comprise one or more layers. The one or more hydrophilic ethylenically unsaturated monomers containing acid functionality may comprise one or more hydrophilic ethylenically unsaturated monomers containing at least one carboxylic acid group. The one or more hydrophilic ethylenically unsaturated monomers containing acid functionality may comprise one or more of acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate and monomethyl itaconate. The one or more nonionic hydrophilic ethylenically unsaturated monomers may comprise one or more unsaturated nitriles, unsaturated amides, alkyl or alkenyl esters of (meth)acrylic acid. The one or more hydrophobic ethylenically unsaturated monomers may comprise one or more vinylidene substituted aromatic monomers or esters of acrylic acid or methacrylic acid which exhibit low solubility in water. The one or more hydrophobic ethylenically unsaturated monomers may comprise one or more vinylidene aromatic monomers.

Disclosed is a process comprising: a) contacting a mixture of one or more of the one or more hydrophilic unsaturated monomers containing acid functionality, one or more nonionic hydrophilic ethylenically unsaturated monomers and, optionally, one or more hydrophobic ethylenically unsaturated monomers with water at elevated temperatures; and b) contacting one or more polymerization initiators with the water or with the mixture of a); wherein the mixture of monomers is contacted with the water in a single charge and polymeric acid core particles are formed from one or more of one or more hydrophilic unsaturated monomers containing acid functionality, one or more nonionic hydrophilic ethylenically unsaturated monomers and one or more hydrophobic ethylenically unsaturated monomers. The contacting steps may be performed with intimate mixing. The polymerization initiator may be a free radical polymerization initiator. The polymerization initiator may be a water-soluble polymerization initiator. The polymerization initiator may be a water soluble free radical polymerization initiator. The mixture of monomers may be contacted with the water as quickly as possible. The one or more polymerization initiators may be contacted with the mixture of one or more of the one or more hydrophilic ethylenically unsaturated monomers containing acid functionality, one or more nonionic hydrophilic ethylenically unsaturated monomers and one or more hydrophobic ethylenically unsaturated monomers and water as quickly as possible. An emulsifier may be contacted with the water or the monomer mixture. The emulsifier may be one or more of non-ionic and anionic emulsifiers.

Disclosed is process comprising contacting the polymeric acid core particles with one or more of one or more hydrophobic ethylenic unsaturated monomers, one or more hydrophilic ethylenically unsaturated monomers containing acid functionality and one or more nonionic hydrophilic ethylenically unsaturated monomers in the presence of an emulsifier and the one or more polymerization initiators in water under conditions such that the one or more of the one or more hydrophobic ethylenically unsaturated monomers, one or more hydrophilic ethylenically unsaturated monomers containing acid functionality and one or more nonionic hydrophilic ethylenically unsaturated monomers form one or more layers of a shell around the polymeric acid core particles.

Disclosed is a process for forming one or more shell layers about the polymeric acid core particles. Disclosed is a process wherein a shell layer is formed about the polymeric acid core particles comprising contacting the polymeric acid core particles with one or more of one or more hydrophilic ethylenically unsaturated monomers containing acid functionality, one or more hydrophobic ethylenically unsaturated monomers and one or more nonionic hydrophilic ethylenically unsaturated monomers in the presence of an emulsifier and one or more polymerization initiators in water under conditions such that a shell or a first layer of a shell is formed around the polymeric acid core particles. A second layer may be formed by the process comprising contacting the polymeric acid core particles with the first layer of a shell around the polymeric acid core particles with one or more of one or more hydrophobic ethylenically unsaturated monomers, one or more hydrophilic ethylenically unsaturated monomers containing acid functionality and one or more nonionic hydrophilic ethylenically unsaturated monomers, in the presence of an emulsifier and one or more polymerization initiators in water, wherein the concentration of the one or more hydrophilic ethylenically unsaturated monomers containing acid functionality in the mixture is less than the concentration used to form the first layer of the shell under conditions such that a second layer of the shell is formed about the first layer of the shell around the polymeric acid core particles. Additional layers may be formed about the shell formed and the polymeric acid core particles in a similar manner. The final layer of the shell may be formed from one or more of the one or more hydrophobic ethylenically unsaturated monomers, one or more hydrophilic ethylenically unsaturated monomers containing acid functionality and one or more nonionic hydrophilic ethylenically unsaturated monomers. The shell and layers of the shell may comprise one or more hydrophobic ethylenically unsaturated monomers and, optionally one or more hydrophilic ethylenically unsaturated monomers containing acid functionality and/or one or more nonionic hydrophilic ethylenically unsaturated monomers. The hydrophilicity of the shell and shell layers may be adjusted by the nature and amount of the one or more hydrophilic ethylenically unsaturated monomers containing acid functionality and/or one or more nonionic hydrophilic ethylenically unsaturated monomers.

The shell may be swollen by contacting the particles with the polymeric acid core having at least one layer of a shell with a base in water under conditions that the polymeric acid core particles swell and grow in volume. The particles may be swollen and the last layer of the shell formed simultaneously by the contacting of the particles with the shell around the particles with one or more of the one or more hydrophobic ethylenically unsaturated monomers, optionally, one or more hydrophilic ethylenically unsaturated monomers containing acid functionality and optionally, one or more nonionic hydrophilic ethylenically unsaturated monomers in the presence of an emulsifier and one or more polymerization initiators in water and contacting the particles with a base in water at substantially the same time. The time period for contacting the particles with the shell around the particles with one or more of the one or more hydrophobic ethylenically unsaturated monomers, optionally, one or more hydrophilic ethylenically unsaturated monomers containing acid functionality and, optionally, one or more nonionic hydrophilic ethylenically unsaturated monomers, in the presence of an emulsifier and one or more polymerization initiators in water may continue after the contacting of the particles with a base in water is stopped, whereby the thickness of the last layer of the shell may be increased. The contacting of the structure comprising the expanded shell with the emulsifier and one or more polymerization initiators may be continued until the amount of unreacted monomers is about 200 parts per million by weight or less or about 100 parts per million by weight or less. After expanding the shell and preparing the outer layer of the shell, the structure may be dried and air may fill the portion of the core which does not contain the dried polymeric acid core thereby forming a void in the expanded particles.

Disclosed is a composition comprising: hollow spheres having a shell having one or more layers encapsulating the polymeric acid core, the product formed is a structure comprising a shell having one or more layers surrounding a core comprising a portion of the dried polymeric acid core and a void, wherein the one or more shell layers comprise one or more polymers of one or more of the one or more hydrophilic ethylenically unsaturated monomers containing acid functionality, the one or more hydrophobic ethylenically unsaturated monomers and one or more nonionic hydrophilic ethylenically unsaturated monomers, the polymers having a lower percentage of the one or more hydrophilic ethylenically unsaturated monomers containing acid functionality in each layer from the inside layer to the outside layer of the shell. Disclosed are compositions comprising hollow spheres comprising the shell having multiple layers surrounding a void, for example three layers, wherein the first shell layer comprises one or more polymers of one or more of the one or more hydrophilic ethylenically unsaturated monomers containing acid functionality, the one or more hydrophobic ethylenically unsaturated monomers and one or more nonionic hydrophilic ethylenically unsaturated monomers; the second shell layer comprises one or more polymers of one or more of one or more hydrophilic ethylenically unsaturated monomers containing acid functionality, one or more hydrophobic ethylenically unsaturated monomers and one or more nonionic hydrophilic ethylenically unsaturated monomers, the polymers having a lower percentage of the one or more hydrophilic ethylenically unsaturated monomers containing acid functionality than the first layer; and the third layer comprises one or more polymers of one or more of the one or more hydrophobic ethylenically unsaturated monomers, optionally, one or more hydrophilic ethylenically unsaturated monomers containing acid functionality and, optionally, one or more nonionic hydrophilic ethylenically unsaturated monomers, having a lower concentration of the one or more hydrophilic ethylenically unsaturated monomers containing acid functionality than the second layer; wherein after drying of the structure adjacent to the first layer is a portion of the dried polymeric acid core and the void is filled with air. The resulting product comprises the polymeric acid core having up to 50 percent by weight of the one or more hydrophilic ethylenically unsaturated monomers containing acid functionality. The first shell layer may comprise up to about 35 percent by weight of the one or more hydrophilic ethylenically unsaturated monomers containing acid functionality; the second shell layer may comprise up to about 15 percent by weight one or more hydrophilic ethylenically unsaturated monomers containing acid functionality; and the outer layer may comprise up to about 0 to about 5 percent by weight of one or more hydrophilic ethylenically unsaturated monomers containing acid functionality. The disclosed particles may be transported in a water dispersion. The particles may be dried during or just prior to use and upon drying may have the void filled with a gas e.g. air.

Disclosed are hollow polymeric spheres with controlled particle size, which can have larger particle sizes and high void volume percentages. The disclosed processes enable the preparation of hollow polymeric spheres having desired particle sizes and narrow particle size distributions. The disclosed processes do not require the use of preformed seeds to prepare the acid core for hollow polymeric spheres, form low amounts of residues during processing and prepare the claimed structures faster.

The hollow polymeric spheres disclosed may be used in paper coatings and paperboard. Paper and paperboard manufacturers use surface treatments on a variety of substrates to improve the functionality of paper substrates. A multitude of coatings can be applied to enhance print quality, provide durability, or enhance surface smoothness as examples. In the case of most coatings, the cost of the substrate and that of the coatings needs to be balanced to ensure the resulting product is not cost prohibitive for the application. In the case of barrier coatings, many materials used are quite expensive, so it is critical the coating provides the enhanced benefit of barrier performance at the least possible coating weight. Coatings can be applied through a variety of techniques using various application equipment to apply the coating and in most cases a metering technique is used to remove the excess coating. The remaining coated surface must be free from defects to insure there is no path for the fluid to transport through to the substrate. Defects could include pin holes caused by uncoated fibers or voids in the coating layer as examples. For rougher substrates even higher levels of coating weight are required to provide sufficient coverage to avoid defects. It is often expected that two layers of coating are used to overcome many of these defects. An unexpected benefit of utilizing large, hollow polymeric sphere pigments in a barrier coating layer has uncovered a unique performance combination of improved barrier performance while improving blocking resistance. Increasing the hollow polymeric spheres level in an all synthetic barrier coating results in significantly improved barrier performance up to a certain level of pigment addition. The performance improvement is believed to come about as a result of the decreased coating density, or sometimes referred to as increased bulk, obtained through the use of large hollow spheres in the coating layer. The thicker, less dense coating layer brought about by air filled voids results in more efficient coverage of the base sheet which allows lower coat weights allowing less overall coating to be used or improved performance at standard coat weights. Blocking resistance is provided by these large spheres as they are exposed at the coating surface increasing roughness which provides a less tacky or sticky surface due to the high Tg of the hollow spheres at the surface. Improved barrier performance when the coated paper or paperboard is folded or creased is also observed as the air filled voids within the coating can compress or extend around or within the crease to promote flexibility and crack resistance within the barrier layer. Barrier performance as measured by kit test, hot oil test, and blocking resistance supports an optimum level of hollow spheres which further confirms the benefit of this material in the coating. Disclosed is paper coated with a coating comprising the hollow spheres disclosed herein. Disclosed is a composition comprising paper or paperboard with a coating disposed on at least one surface wherein the coating comprises a composition as described herein. The barrier coating contains a continuous phase of polymeric (either synthetic or biobased) binder contains optimized levels of the hollow spere pigments wherein the spheres remain in the discontinuous phase as to not disturb the barrier performance by creating pores in the coating to the substrate.

DETAILED DESCRIPTION

Figure 1:
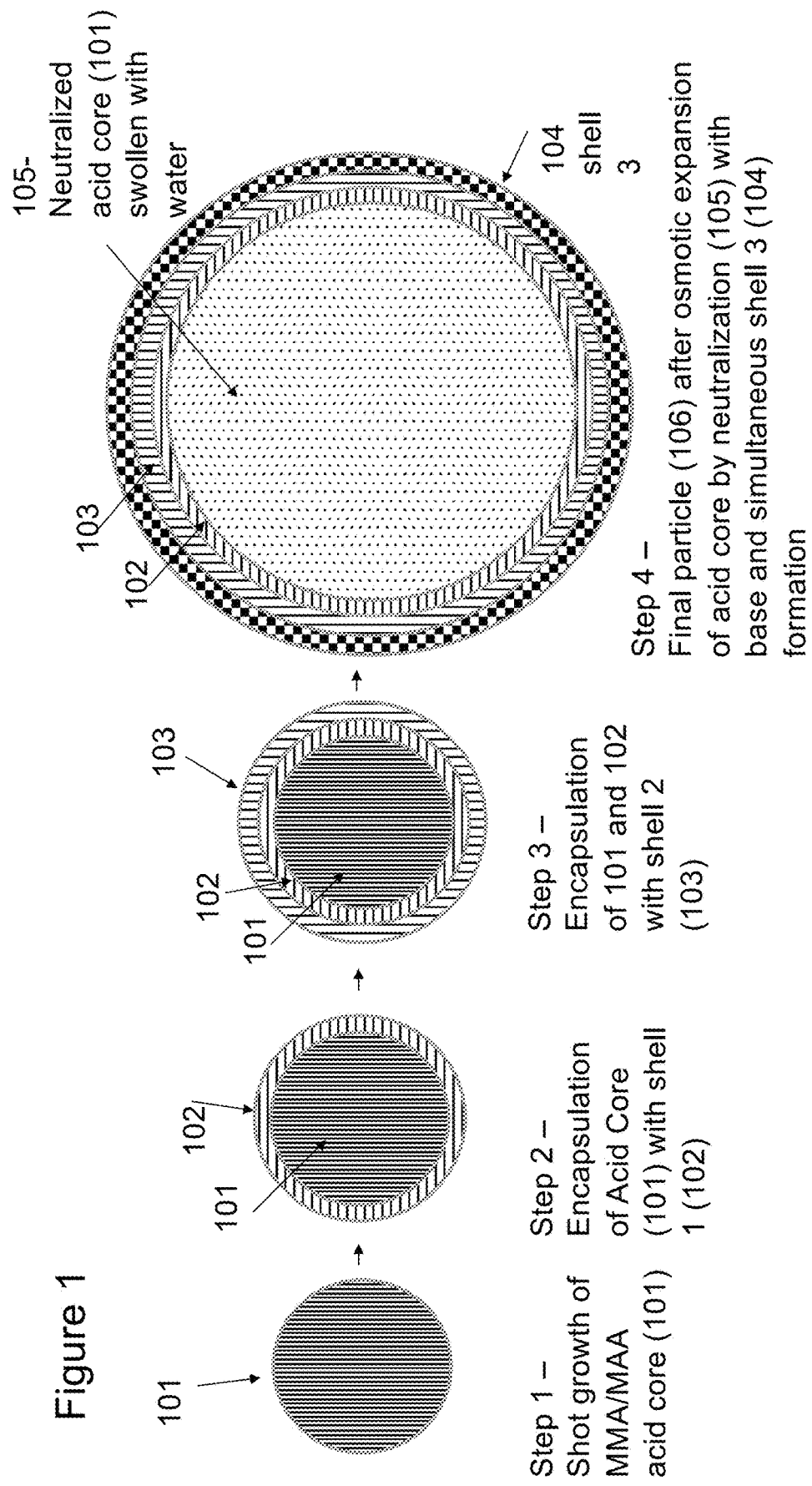
FIG. 1 illustrates the basic steps of the process with the resulting product.

The explanations and illustrations presented herein are intended to acquaint others skilled in the art with the invention, its principles, and its practical application. Those skilled in the art may adapt and apply the invention in its numerous forms, as may be best suited to the requirements of a particular use. The specific embodiments of the present disclosure as set forth are not intended as being exhaustive or limiting of the teachings. The scope of the teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application relates to hollow polymer spheres with controlled particle sizes. The hollow polymer spheres may exhibit a wide range of particle sizes and void volume. The particle sizes may exhibit relatively narrow particle size distribution or standard deviation. The hollow polymer spheres may exhibit low amounts of unreacted monomers. The hollow polymer spheres comprise an expanded shell about a hollow core, the shell having one or more layers, the one or more shell layers may comprise one or more of one or more hydrophilic ethylenically unsaturated monomers containing acid functionality, one or more hydrophobic ethylenically unsaturated monomers and one or more non-ionic hydrophilic ethylenically unsaturated monomers. The concentration of the one or more hydrophilic ethylenically unsaturated monomers containing acid functionality may vary across the thickness of the shell with the concentration higher near the hollow core and lower near the outside of the shell. The core contains the polymeric acid core used to form the core portion and upon which the shell is formed. The polymeric acid core may be in contact with a portion of the inside of the shell. When the water absorbed in the swollen core evaporates and the core material shrinks and the volume inside the shell vacated by the shrinking core is replaced by gas, such as air. The polymeric acid core may be a copolymer prepared from one or more of one or more hydrophilic ethylenically unsaturated monomers containing acid functionality, one or more nonionic hydrophilic ethylenically unsaturated monomers and, optionally one or more hydrophobic ethylenically unsaturated monomers. The polymeric acid core may have up to 50 percent by weight of the one or more hydrophilic ethylenically unsaturated monomers containing acid functionality. The one or more hollow particles may comprise a shell surrounding a void as described herein, the inner portion of the shell comprises a portion of the acid core remaining after swelling, the outer portion of the shell is the hydrophobic shell layer and disposed between the inner portion and the outer hydrophobic shell is one or more layers which function adhere the inner portion to the outer hydrophobic shell. The process disclosed enables the preparation of hollow spheres with the advantages disclosed herein. The process comprises forming the polymeric acid core, forming the shell around the polymeric acid core and swelling the shell by contacting the shell with the polymeric acid core disposed therein with a base in water. Thereafter, the swollen shell is dried, such as by evaporating the water contained in the polymeric acid core, to form the described structures. After evaporating the water contained in the swollen polymeric acid core surrounded by the expanded shell, the described structures are formed. Hydrophilic as used in this document refers to the monomers that exhibit a water solubility of greater than 0.3 grams/100 $cm^3$ at 80° C. Hydrophobic, or low hydrophilicity, as used in this document refers to the monomers that exhibit a water solubility of 0.3 grams/100 $cm^3$ at 80° C. or less. Non-ionic means the monomers do not have ionizable groups such as acids.

The formed structure comprises an expanded shell having one or more layers in the shell. The shell may have identifiable discrete layers or may be have a gradient of the concentrations of the monomers described wherein the concentration of the one or more hydrophilic ethylenically unsaturated monomers containing acid functionality decreases from the inside of the shell to the outside of the shell in a gradual manner, in essence there is a concentration gradient of the one or more hydrophilic ethylenically unsaturated monomers containing acid functionality from the inside of the shell to the outside of the shell. Inside the expanded shell a void forms which may be filled by a gas, such as air, upon drying, thus replacing the volume of the dried and shrunk polymeric acid core. Any gas that can be used in the drying of the structure may be found in the void space. Air is commonly used to dry the structure and is found in the void space. The volume of the structure comprising the void space, which may be, filled with gas, may be about 30 volume percent of greater, about 40 volume percent or greater, about 45 volume percent or greater, about 50 volume percent or greater, about 55 volume percent or greater or about 60 volume percent or greater. The volume of the structure comprising the void space may be about 70 volume percent or less, about 65 volume percent or less or about 60 volume percent or less. The particle size of the hollow particles can be any particle size desired for an application, the process described herein provides the flexibility to prepare particles having any desired size. The particle size of the formed hollow polymeric spheres may be about 200 nanometers or greater, about 300 nanometers or greater, about 400 nanometers or greater, about 500 nanometers or greater, about 600 nanometers or greater, about 700 nanometers or greater, about 800 nanometers or greater, about 900 nanometers or greater, about 1000 nanometers or greater, about 1100 nanometers or greater, about 1200 nanometers or greater or about 1300 nanometers or greater. The particle size may be about 2000 nanometers or less, about 1900 nanometers or less, about 1800 nanometers or less, about 1700 nanometers or less or about 1600 nanometers or less. Particle size refers to the volume average particle size as measured by Dynamic Light Scattering (DLS) for particles below 1 micron and Static Light Scattering for particles above 1 micron, for the particles in aqueous dispersion. The disclosed structures have a narrow particle size distribution as determined by measuring the span. The particle size span may be determined by Static Light Scattering, with instruments such as Beckman LS 13320 XR. A common way to describe a particle size distribution uses a method to describe the shape of the distribution, such as the width or broadness. In laser diffraction analysis a span is calculated by the formula Span=$(Dv_{90}-Dv_{10})/Dv_{50}$ where Dv is the particle size below which a certain volume percentage of the particle population can be found. Another common description for the distribution is also the coefficient of variation (CV), as the ratio of the standard deviation to the arithmetic mean. It is desirable for the polymer shell to contain low levels of unreacted monomers. In the dry state, the particle size distribution and the span of the acid cores and the hollow particles may be determined through the use of scanning electric microscopes to prepare pictures of the acid cores and the hollow spheres formed. Electron microscopy is the most accurate method to assess the size and distribution of the particles, since there is no influence of underlying assumptions and mathematic algorithms which are needed for the light scattering and diffraction methods. In particular, a FlexSEM 1000 can be used to generate the particle photos. The magnification level is chosen to allow calculation of the particle sizes of the non-collapsed particles. Diluted samples of acid core and hollow latexes are dried, for example are dried on aluminium foil and sputtered with Platinum under an Argon atmosphere, using a MC1000 Ion Sputter by Hitachi (15 mA, 20 sec). The particle sizes are determined manually by using the FlexSEM 1000 software features. The particle size of each non-collapsed particle is measured and recorded and the distribution is calculated manually. This data can be used to calculate span and the volume average size. The calculation ignores those particles which collapse during the drying step. The method used to determine the particle sizes must be able to eliminate the collapsed particles. Manual examination of the pictures can achieve this. Spreadsheets can be used into aid in the calculation. The span may be about 0.2 or less. The particle size distribution of the particles or the cores may be such that about 80 percent of the particle volume lies within 10 percent of the mean volume particle size (Debroukere mean, rsp. D[4/3]). The term 10% of mean volume particle size refers to 80 percent of the particles meeting the feature of +/−5% mean size. The level of the unreacted monomers in the hollow polymeric spheres, including hydrophobic ethylenically unsaturated monomers, hydrophilic ethylenically unsaturated monomers containing acid functionality and nonionic hydrophilic ethylenically unsaturated monomers in the latex containing the hollow polymeric spheres is desirably as low as possible. The concentration of the residual monomers may be 1000 ppm or less, 900 ppm or less, 800 ppm or less, 700 ppm or less, 600 ppm or less, 500 ppm or less, 400 ppm or less, 300 ppm or less or 200 ppm or less. The concentration of the residual monomers in the latex containing the hollow polymeric spheres is measured wet, meaning that the latex containing the hollow polymeric spheres is measured for residual monomers.

The polymeric acid core may comprise one or more polymers containing one or more of one or more hydrophilic ethylenically unsaturated monomers containing acid functionality, one or more nonionic hydrophilic ethylenically unsaturated monomers and, optionally, one or more hydrophobic ethylenically unsaturated monomers. The one or more hydrophilic ethylenically unsaturated monomers containing acid functionality may be any compounds containing both unsaturation that polymerize through the unsaturated groups and which contain acid groups. The one or more hydrophilic ethylenically unsaturated monomers containing acid functionality exhibit polarity and may be soluble in water under the conditions under which the polymeric acid copolymer can be formed, including those disclosed in the document. The one or more nonionic hydrophilic ethylenically unsaturated monomers may not be water soluble under all polymerization conditions and can be dispersed in the water as disclosed herein. The acid groups may be carboxylic acids. The one or more hydrophilic ethylenically unsaturated monomers containing acid functionality may comprise one or more hydrophilic monoethylenically unsaturated monomers containing at least one carboxylic acid group. The one or more hydrophilic ethylenically unsaturated monomers containing acid functionality comprises one or more of acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate and monomethyl itaconate. The one or more hydrophilic ethylenically unsaturated monomers containing acid functionality may comprise acrylic acid or methacrylic acid mixtures thereof. The polymeric acid core may be prepared from one or more hydrophilic ethylenically unsaturated monomers containing acid functionality in sufficient amount such that when the copolymer formed is contacted with base in water the polymeric acid core forms a gel and swells and expands the shell around the polymeric acid core. The mixture used to form the polymeric acid core may contain one or more hydrophilic ethylenically unsaturated monomers containing acid functionality in an amount of about 15 percent by weight or greater based on the weight of the polymeric acid core, about 25 percent by weight or greater, about 35 percent by weight or greater or about 40 percent by weight or greater. The mixture used to form the polymeric acid core may contain one or more unsaturated hydrophilic monomers containing acid functionality in an amount of up to and including about 50 percent by weight based on the weight of the polymeric acid core, up to and including 45 percent by weight or up to and including about 35 percent by weight.

The polymeric acid core may contain one or more nonionic hydrophilic ethylenically unsaturated monomers. Any nonionic hydrophilic ethylenically unsaturated monomers which contain ethylenic unsaturation, are nonionic, and which form polymers with the hydrophilic ethylenically unsaturated monomers containing acid functionality and/or one or more hydrophobic ethylenically unsaturated monomers may be used. The one or more nonionic hydrophilic ethylenically unsaturated monomers may be (meth)acrylate compounds which meet the water solubility criteria. The one or more nonionic hydrophilic ethylenically unsaturated monomers may comprise one or more unsaturated nitriles, unsaturated amides, alkyl or alkenyl esters of (meth)acrylic acid. The one or more nonionic hydrophilic ethylenically unsaturated monomers may comprise one or more alkyl or alkenyl esters of (meth)acrylic acid. The one or more nonionic hydrophilic ethylenically unsaturated monomers may comprise one or more of (meth)acrylonitrile, (meth)acrylamide, methyl (meth)acrylate, ethyl (meth)acrylate, hydroxyethyl(meth)acrylate, hydroxypropyl(meth)acrylate. The one or more nonionic hydrophilic ethylenically unsaturated monomers may comprise one or more of methyl (meth)acrylate and ethyl (meth)acrylate. The one or more nonionic hydrophilic ethylenically unsaturated monomers comprises methyl (meth)acrylate. The one or more nonionic hydrophilic ethylenically unsaturated monomers may be one or more nonionic hydrophilic monoethylenically unsaturated monomers. The monomer mixture used to form the polymeric acid core may contain one or more nonionic hydrophilic ethylenically unsaturated monomers in an amount of about 40 percent by weight or greater, about 45 percent by weight or greater, about 50 percent by weight or greater or about 60 percent by weight or greater. The mixture used to form the polymeric acid core may contain nonionic hydrophilic ethylenically unsaturated monomers in an amount of up to and including 85 percent by weight, up to and including 75 percent by weight, up to and including 65 percent by weight, up to and including 55 percent by weight or up to and including 50 percent by weight. The polymeric acid core may additionally contain one or more hydrophobic ethylenically unsaturated monomers, as defined hereinafter, in an amount of about 1 to about 20 percent by weight.

The shell may comprise a polymer prepared from one or more of one or more hydrophilic ethylenically unsaturated monomers containing acid functionality, one or more hydrophobic ethylenically unsaturated monomers and one or more nonionic hydrophilic ethylenically unsaturated monomers. Although the outer layers of the shell polymer may be a homopolymer, and it may be a copolymer comprised of recurring polymerized units of two or more different monomers as disclosed herein and may include one or more hydrophobic ethylenically unsaturated monomers capable of being polymerized by free radical polymerization. The one or more hydrophobic ethylenically unsaturated monomers are more hydrophobic than the polymeric acid core and when used in quantities of 20 weight percent or greater or 30 weight percent or greater form a shell about the polymeric acid core. The one or more hydrophobic ethylenically unsaturated monomers may be one or more vinylidene substituted aromatic monomers, esters of acrylic acid or methacrylic acid which exhibit low solubility in water as described herein, and any other ethylenically unsaturated monomers which are hydrophobic and which can form a shell layer about the polymeric acid core such as olefins such as ethylene, vinyl acetate, vinyl chloride, vinylidene chloride. Exemplary esters of acrylic acid or methacrylic acid which exhibit low solubility in water include butyl (meth)acrylate, 2-ethylhexyl (meth)acrylate, benzyl (meth)acrylate, lauryl (meth) acrylate, oleyl (meth)acrylate, palmityl (meth)acrylate and stearyl (meth)acrylate. Exemplary vinylidene substituted aromatic monomers include styrene; alkyl substituted styrenes (such as alpha methyl styrene, p-methyl styrene, t-butyl styrene); vinyltoluene; and halo substituted styrenes (such as chlorinated styrenes). The vinylidene substituted aromatic monomers may be styrene or halo or alkyl substituted styrene; alpha-methyl styrene and styrene; or styrene. The vinylidene substituted aromatic monomers may be mono-vinylidene substituted aromatic monomers, which contain one unsaturated group. The vinylidene substituted aromatic monomer may be styrene. Vinylidene aromatic monomers include but are not limited to those described in U.S. Pat. Nos. 4,666,987; 4,572,819 and 4,585,825, which are herein incorporated by reference. The one or more hydrophobic ethylenically unsaturated monomers may be one or more hydrophobic monoethylenically unsaturated monomers. Where one or more hydrophobic ethylenically unsaturated monomers are included in the core, the one or more hydrophobic ethylenically unsaturated monomers may be one or more hydrophobic (meth)acrylates, having low solubility in water.

The polymeric acid core and/or the shell polymers may additionally contain one or more polyethylenically unsaturated monomer in amounts, based on the polymers formed, of about 0.01 or about 0.1 to about 1.0 percent. Exemplary polyethylenically unsaturated monomers include co-monomers containing at least two polymerizable vinylidene groups such as $\alpha,\beta$-ethylenically unsaturated monocarboxylic acid esters of polyhydric alcohols containing 2-6 ester groups; alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and methylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis- acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol, mono dicyclopentenyl ethers; allyl esters of $\alpha,\beta$-unsaturated mono- and dicarboxylic acids having terminal ethylenic unsaturation including allyl methacrylate, allyl acrylate, diallyl maleate, diallyl fumarate, diallyl itaconate and the like.

Disclosed is a process for preparing the hollow polymer spheres. The disclosed process provides significant flexibility to prepare voided latex particles with different dimensions and compositions. The first step of the process disclosed is the formation of the polymeric acid core. A monomer charge is prepared from one or more of one or more hydrophilic ethylenically unsaturated monomers containing acid functionality, one or more nonionic hydrophilic ethylenically unsaturated monomers and, optionally, one or more hydrophobic ethylenically unsaturated monomers. The monomers and the amounts of monomers for the core are chosen to provide a polymeric acid core which is swellable when contacted with base in water and which provide the advantages of the hollow polymer spheres discussed in this document. The monomer charge may comprise other ethylenically unsaturated compounds that do not negatively impact the polymeric acid core. The monomer charge is polymerized to form polymeric acid core particles. Polymeric acid core means the particles contain the desired level of acid groups. The monomer charge may be polymerized in water. The monomers may be contacted together and thereafter be contacted with water. It may be desirable to contact the monomer charge with water by adding the monomer charge to a reactor containing water. The monomer charge may be contacted with water as quickly as possible. The monomer charge may be contacted with the water over a period of about 60 seconds or less, about 30 seconds or less or about 20 seconds of less. This contacting method may be referred to as adding the monomer charge to water in a one-shot manner. The time period for adding the monomer charge to water is controlled by the practicalities of adding the monomer charge to water and may be impacted by the amounts of the monomer(s) to be added to the amounts of water. The monomer charge may be contacted with water with mixing. Intimate mixing of the contacted materials is desired. Methods of intimate mixing are well known to those skilled in the art and exemplary mixing apparatus and methods are disclosed in this document.

To form the swollen hollow polymeric (latex) particles with the disclosed properties the ratio of monomers used to prepare the polymeric acid core to water is chosen to provide the desired size of particles with the disclosed properties. Any ratio of monomers used to prepare the polymeric acid core to water which achieves these objectives may be utilized. The ratio by weight of monomers added to water may be about 1:4 or more, about 1:5 or more or about 1:6 or more. The ratio by weight of monomer added to water may be about 1:20 or less, about 1:15 or less, or about 1:10 or less.

The process for preparing the polymeric acid core may be performed in the presence of polymerization initiators. The polymerization initiators may be free radical polymerization initiators. The polymerization initiators may be water-soluble polymerization initiators. The polymerization initiators may be water-soluble free radical polymerization initiators. The polymerization initiators may be contacted with the water or a mixture of the monomers and water. The polymerization initiators may be contacted with the mixture of the monomers and water. The water-soluble polymerization initiator may be any water-soluble polymerization initiators that initiate free radical polymerization of the monomer systems disclosed. The water-soluble polymerization initiators may be any water-soluble free radical polymerization initiator utilized in the aqueous emulsion polymerization. Exemplary water-soluble free radical polymerization initiators comprise one or more peroxide compounds, diazo compounds, alkali metal persulfates or mixtures thereof. Exemplary water-soluble free radical polymerization initiators include hydrogen peroxide; tert-butyl peroxide; diazo initiators; alkali metal persulfates such as sodium, potassium and lithium persulfate; ammonium persulfate; and mixtures of such initiators with a reducing agent. Reducing agents include sulfites, such as alkali metal metabisulfite, hydrosulfite, and hyposulfite; sodium formaldehyde sulfoxylate; and reducing sugars such as ascorbic acid and isoascorbic acid. The water-soluble polymerization initiators may comprise one or more alkali metal persulfates. The water-soluble polymerization initiators may be utilized in a sufficient amount to form the polymeric acid core in an efficient manner. The water-soluble polymerization initiators may be present in a total amount of about 0.05 percent by weight or greater based on the total amount of monomers employed or about 0.10 percent by weight or greater. The water-soluble polymerization initiator may be present in a total amount of about 1.0 percent by weight or less based on the total amount of monomers employed, about 0.45 percent by weight or less or about 0.30 percent by weight or less. The polymerization initiators may be fed into the polymerization reactor right before emulsion polymerization is initiated. The one or more polymerization initiators may be contacted with water before contacting the monomer charge with water. The one or more polymerization initiators and the monomer charge may be contacted with water at the same time. The one or more polymerization initiators may be contacted with the monomer charge and water after addition of the monomer mixture to the water. This contacting may be performed in a reactor. The one or more polymerization initiators may be contacted with the monomer mixture and water as quickly as possible as previously disclosed.

The formation of the polymeric acid core may take place in the presence of an emulsifier. Any emulsifier and amount thereof which stabilizes the reaction mixture to enhance formation of the polymeric acid core particles may be utilized. The emulsifier may be nonionic and/or anionic. The emulsifier may be nonionic. The emulsifier may be anionic. Exemplary nonionic emulsifiers include tert-octylphenoxyethylpoly(39)-ethoxyethanol, dodecyl oxypoly (10) ethoxy ethanol, nonyl phenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethyl cellulose-polybutyl acrylate graft copolymer, dimethyl silicone polyalkylene oxide graft copolymer, poly(ethylene oxide) poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxy ethylene(20) lauramide, N-lauryl-N-polyoxyethylene(3)amine and poly(10) ethylene glycol dodecyl thioether. Exemplary anionic emulsifiers include sodium lauryl sulfate, sodium dodecyl benzene sulfonate, potassium stearate, sodium dioctyl sulfo succinate, sodium dodecyldiphenyloxide disulfonate, nonylphenoxyethylpoly(I) ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14-16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkyl amido polyethoxy sulfosuccinate, disodium ethoxylated nonylphenol half ester of sulfo succinic acid and the sodium salt of tert-octylphenoxyethoxypoly(39)ethoxyethyl sulfate. The one or more emulsifiers may be added prior to the addition of any monomer charge, during the addition of a monomer charge or a combination thereof. The emulsifier may be contacted with the water or the monomer charge. The emulsifier may be added to the monomer charge before contact with the water. The emulsifier may be added to water before adding the monomer charge to water. Emulsifiers may be used in amounts which stabilize the reaction mixture to enhance formation of the polymeric acid core particles and which reduce the tendency to produce residue in the reaction medium. The emulsifier may be present in a total amount of about 0 percent by weight or greater based on the total amount of monomers employed, about 0.01 percent by weight or greater, about 0.05 percent by weight or greater or about 1.0 percent by weight or greater. The emulsifier may be present in a total amount of about 5.0 percent by weight or less based on the total amount of monomers employed, about 3.0 percent by weight or less, about 2.0 percent by weight or less, about 1.0 percent by weight or less, about 0.5 percent by weight or less, or about 0.1 percent by weight or less.

The formation of the polymeric acid core may be performed at any temperature at which the polymeric acid core particles are formed. The preparation of the polymeric acid core may be performed at a temperature of about 30° C. or greater, about 50° C. or greater or about 75° C. or greater. The preparation of the polymeric acid core may be performed at a temperature of about 100° C. or less.

The formation of the polymeric acid core is complete when the desired particle size of the polymeric acid core is reached. The disclosed process allows the formation of particles having a wide range of sizes and compositions. Exemplary particle sizes of the core, before swelling, are about 100 nm or greater, about 250 nm or greater, about 500 nm or greater or about 750 nm or greater. Exemplary particle sizes of the core before swelling are about 1000 nm or less, about 750 nm or less, about 500 nm or less or about 250 nm or less. The formed polymeric acid core may be recovered from the reaction system after formation or it may remain in the reaction system and the shell formed about the polymeric acid core. The formed polymeric acid core may be left in the reaction system and the shell formed about the polymeric acid core by emulsion polymerization.

The next step is to form a shell about the polymeric acid core. The shell needs to have a composition, thickness and coverage over the polymeric acid core sufficient to fully encapsulate the polymeric acid core, allow the base in water used to swell the polymeric acid core to permeate through the shell to swell the polymeric acid core and once swollen to retain the size of the swollen structure during drying. Th7e shell may exhibit sufficient thickness and composition to function as desired in the final use of the swollen structures. The shell may be formed by emulsion polymerization about the polymeric acid core. The shell may have one or more discrete layers or may have one layer with a consistent composition of the polymer forming the shell or a gradient of the composition from the interior to the exterior of the shell. The process can be adapted to form the shell as needed for the final application. The process conditions and ingredients to form the shell about the polymeric acid core may be the same as used to form the polymeric acid core, except where specifically disclosed in this document. The process comprises contacting the polymeric acid core particles with one or more of one or more hydrophilic ethylenically unsaturated monomers containing acid functionality, one or more hydrophobic ethylenic unsaturated monomers and one or more nonionic hydrophilic ethylenically unsaturated monomers in the presence of an emulsifier and the one or more polymerization initiators in water under conditions such that the mixture the monomers forms a layer of a shell around the polymeric acid core particles. The process may form a second layer on the first layer deposited about the polymeric acid core. This process step comprises contacting the polymeric acid core particles with a first layer of a shell around the polymeric acid core particles with one or more of one or more hydrophilic ethylenically unsaturated monomers containing acid functionality, one or more hydrophobic ethylenically unsaturated monomers and one or more nonionic hydrophilic ethylenically unsaturated monomers, in the presence of an emulsifier and one or more polymerization initiators in water, wherein the concentration of the one or more hydrophilic ethylenically unsaturated monomers containing acid functionality in the mixture is less than the concentration used to form the first layer of the shell under conditions such that a second layer of the shell is formed about the first layer of the shell around the polymeric acid core particles. More than two layers may be formed about the polymeric acid core using the disclosed process. The process may comprise contacting the acid polymer core particles with the first layer and the second layer of the shell around the particles with one or more of one or more hydrophobic ethylenically unsaturated monomers, one or more hydrophilic ethylenically unsaturated monomers containing acid functionality and one or more nonionic hydrophilic ethylenically unsaturated monomers in the presence of an emulsifier and one or more polymerization initiators in water such that a third layer of the shell having an acid content in the layer less than the acid content in the second layer is formed about the particles with the first and second layers of the shells around the particles. The amount of emulsifier utilized in forming the shell may be higher than used in forming the acid core particles.

The contacting of the particles with the shell around the particles with one or more of the one or more hydrophobic ethylenically unsaturated monomers, one or more hydrophilic ethylenically unsaturated monomers containing acid functionality and one or more nonionic hydrophilic ethylenically unsaturated monomers in the presence of an emulsifier and the one or more polymerization initiators in water and contacting the polymeric acid core particles with a base in water may start at substantially the same time and may be performed in a batch or semi batch manner. The formation of the last layer on the particles may start at or about the same time as contacting the particles with a base in water. The formation of the one or more shell layers may be performed at any temperature at which the shell layers are formed. The preparation of the one or more shell layers may be performed at a temperature of about 30° C. or greater, about 50° C. or greater or about 75° C. or greater. The preparation of the one or more shell layers may be performed at a temperature of about 100° C. or less.

The polymeric acid core layer is swollen by contacting the particles with the polymeric acid core having one or more layers of the shell about the core with a base in water under conditions such that the polymeric acid core particles absorb water and swell expanding the shell hydraulically. The base functions as a swelling agent for the polymeric acid core. The polymeric acid core is contacted with a basic swelling agent that permeates the shell to at least partially neutralize the hydrophilic functionality of the core. The core may be exposed to a basic swelling agent having a pH of from about 6 to about 12. This results in swelling by osmosis of the hydrophilic polymeric acid core polymer. The basic swelling agents include those which, in the presence of the polymeric acid core surrounded by the shell, are capable of permeating the shell and swelling the core. Swelling agents may be aqueous or gaseous, volatile or fixed bases or combinations thereof. Exemplary swelling agents include volatile bases such as ammonia, ammonium hydroxide, such as aqueous ammonium hydroxide, and volatile lower aliphatic amines, such as morpholine, trimethylamine, and triethylamine, and the like; fixed or permanent bases such as sodium hydroxide, potassium hydroxide, lithium hydroxide, zinc ammonium complex, copper ammonium complex, silver ammonium complex, strontium hydroxide, barium hydroxide and the like. Swelling agents used may be sodium hydroxide and/or potassium hydroxide.

The amount of swelling agent can be less than, equal to or greater than the amount needed to provide for complete neutralization of the core. The amount of swelling agent may be range of from about 75 to about 150 mole percent, based on the total amount of acid contained in the core and the shell. Swelling is efficient under conditions of elevated temperature. The elevated temperature in the swelling step may be about 50° C. or greater or about 80° C. or greater. The elevated temperature in the swelling step may be about 95° C. or less or about 120° C. or less. The particles are swollen for a sufficient time to swell the core to the desired size to expand the shell to the desired size. Under these conditions, most of the swelling may be complete within about 30 minutes or less, about 20 minutes or less or about 10 minutes or less after adding the one or more swelling agents.

A layer of the shell may be formed at the same time as the polymeric acid core is swollen. If a single layer is applied to the polymeric acid core polymer, after a portion of the layer is formed the polymeric acid core may be swollen while another portion of the shell is formed. The period for contacting the particles with the shell around the particles with one or more of the one or more hydrophobic ethylenically unsaturated monomers, one or more hydrophilic ethylenically unsaturated monomers containing acid functionality and one or more nonionic hydrophilic ethylenically unsaturated monomers in the presence of an emulsifier and the one or more polymerization initiators in water may continue after the contacting of the particles with a base in water is stopped, whereby the thickness of the shell, or the last layer of the shell, is increased. After contact with the base is discontinued, one or additional shell layers may be formed utilizing the disclosed process and monomers disclosed herein which may be a different composition as utilized previously. Such composition may include additional ingredients to enhance the function and/or appearance of the particle. Such additional ingredients may include, pigments, filler binders and the like. After contact with the base is discontinued, the swollen shell may continue to be contacted with the one or more polymerization initiators or a redox system commonly used for free radical polymerization for a period of time sufficient to reduce the amount of unreacted monomers in the formed swollen shell. The contacting of the structure comprising the swollen shell with the one or more polymerization initiators may be performed at a temperature of from about 50 to about 110° C. This step may be continued until the desired level of unreacted monomer is present in the shell.

After synthesis of the shell and swelling of the shell is completed the structure may be dried in the presence of a gas, such as air, under conditions that the core shrinks and a void filled with the gas, such as air, is formed inside of the shell. The particles may be dried by exposure to air at elevated temperatures.

The reactor used to prepare the hollow structures functions to receive one or more components or mixtures and assist in reacting or combining the components or mixtures to form a plurality of hollow polymeric spheres. The reactor may include heating, cooling, or both. The reactor may hold a sufficient amount of fluid, solids, or both for mass production. The reactor may hold about 500 Kg of material or more, about 750 Kg or material or more, or about 1000 Kg of material or more. The reactor may be a main chamber where all of the materials are combined together. The reactor system utilized to prepare the hollow polymer spheres may include a method of intimately mixing the ingredients used to prepare the particles. The method of intimately mixing the ingredients homogenizes all components in the reaction vessel and also in all vessels containing component streams. The mixer may be a magnetic mixer, a mixer rotated by a motor, a fluid jet, or a combination thereof. The process and systems used to prepare the hollow polymer particles may be standard processes and systems utilized in emulsion polymerization. A properly sized feed system may be used to perform rapid addition of the monomer mixture (shot) to the reactor comparable to speeds achievable with beaker additions in lab polymerization reactors. The steps of the process to prepare the hollow particles may be performed in a single reactor with the feed changing to form the one or more layers of the shell. One or more of the steps of the process may be performed in different reactors, or different zones of the same reactor, which may be connected to the other reactors. The product of any of the disclosed steps may be transferred to a subsequent reactor without recovery and/or storage between the steps of the process disclosed. The particles may be transported in the form of a latex and dried before or during final use of the particles.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

EMBODIMENTS

1. A process comprising: a) contacting a mixture of one or more hydrophilic ethylenically unsaturated monomers containing acid functionality, one or more nonionic hydrophilic ethylenically unsaturated monomers and optionally one or more hydrophobic ethylenically unsaturated monomers with water at elevated temperatures; and, b) contacting one or more polymerization initiators with the water or with the mixture of a); wherein the mixture of monomers is contacted with the water in a single charge and polymeric acid core particles are formed from the mixture of one or more hydrophilic ethylenically unsaturated monomers containing acid functionality, one or more hydrophilic nonionic ethylenically unsaturated monomers, and optionally one or more hydrophobic ethylenically unsaturated monomers.

2. The process of Embodiment 1, wherein the mixture of monomers is contacted with the water as quickly as possible.

3. The process of Embodiment 1 or 2 wherein the mixture of one or more hydrophilic ethylenically unsaturated monomers containing acid functionality, one or more nonionic hydrophilic ethylenically unsaturated monomers and optionally one or more hydrophobic ethylenically unsaturated monomers is contacted with intimate mixing.

4. The process of Embodiment any of the preceding embodiments, wherein the mixture of monomers is contacted with the water in 60 seconds or less.

5. The process of any of the preceding embodiments, wherein the one or more hydrophilic ethylenically unsaturated monomers containing acid functionality comprises one or more hydrophilic ethylenically unsaturated monomers containing at least one carboxylic acid group.

6. The process of any of the preceding embodiments, wherein an emulsifier is contacted with the water or the monomer mixture.

7 The process of any of the preceding embodiments, wherein the one or more polymerization initiators are contacted with the mixture of the one or more hydrophilic ethylenically unsaturated monomers containing acid functionality, one or more nonionic hydrophilic ethylenically unsaturated (meth)acrylate monomers and, optionally, one or more hydrophobic (meth)acrylates, and water.

8. The process of embodiment 6, wherein the one or more polymerization initiators are contacted with the mixture of the one or more hydrophilic ethylenically unsaturated monomers containing acid functionality, one or more nonionic hydrophilic ethylenically unsaturated monomers optionally, one or more hydrophobic ethylenically unsaturated monomers, and water as quickly as possible.

9. The process of any of embodiments 6 to 8, wherein the one or more polymerization initiators are contacted with the monomer mixture and water in 120 seconds or less.

10. The process of any of the preceding embodiments, wherein the one or more polymerization initiators are contacted with the water before contacting the monomer mixture with the water.

11. The process of any of the preceding embodiments, wherein the one or more polymerization initiators and the monomer mixture are contacted with the water at the same time.

12. The process of any of the preceding embodiments, wherein the temperature of the monomer mixture and the polymerization initiator is from about 50° C. to about 100° C.

13. The process of any of the preceding embodiments, wherein the temperature of the monomer mixture and the polymerization initiator is from about 75° C. to about 100° C.

14. The process of any of the preceding embodiments, wherein the one or more hydrophilic ethylenically unsaturated monomers containing acid functionality comprises one or more of acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate and monomethyl itaconate.

15. The process of any of the preceding embodiments, wherein the one or more hydrophilic ethylenically unsaturated monomers containing acid functionality comprises one or more of acrylic acid and methacrylic acid.

16. The process of any of the preceding embodiments, wherein the one or more nonionic hydrophilic ethylenically unsaturated monomers comprises one or more unsaturated nitriles, unsaturated amides, alkyl or alkenyl esters of (meth)acrylic acid.

17. The process of any of the preceding embodiments, wherein the one or more nonionic hydrophilic ethylenically unsaturated monomers comprise one or more alkyl or alkenyl esters of (meth)acrylic acid.

18. The process of any of the preceding embodiments, wherein the one or more nonionic hydrophilic ethylenically unsaturated monomers comprise one or more of (meth)acrylonitrile, (meth)acrylamide, methyl (meth)acrylate, ethyl (meth)acrylate, hydroxyethyl(meth)acrylate and hydroxypropyl(meth)acrylate.

19. The process of any of the preceding embodiments, wherein the one or more nonionic hydrophilic ethylenically unsaturated monomers comprise one or more of methyl (meth)acrylate and ethyl (meth)acrylate.

20. The process of any of the preceding embodiments, wherein the one or more nonionic hydrophilic ethylenically unsaturated monomers comprises methyl (meth)acrylate.

21. The process of any of the preceding embodiments, wherein the emulsifier is a non-ionic emulsifier and/or an anionic emulsifier.

22. The process of any of the preceding embodiments, wherein the emulsifier is an anionic emulsifier.

23. The process of any of the preceding embodiments, wherein the emulsifier is mixed with the monomer mixture before contact with the water.

24. The process of any of the preceding embodiments, wherein the polymerization initiator is a free radical polymerization initiator.

25. The process of any of the preceding embodiments, wherein the polymerization initiator is a water soluble polymerization initiator.

26. The process of any of the preceding embodiments, wherein the polymerization initiator is a water soluble free radical polymerization initiator.

27. The process of any of the preceding embodiments, comprising contacting the polymeric acid core particles with one or more of one or more hydrophobic ethylenically unsaturated monomers, one or more hydrophilic ethylenically unsaturated monomers containing acid functionality, and/or one or more nonionic hydrophilic ethylenically unsaturated monomers in the presence of an emulsifier and the one or more polymerization initiators in water under conditions such that a layer of a shell is formed around the polymeric acid core particles.

28. The process of Embodiment 27 wherein the one or more hydrophobic ethylenically unsaturated monomers comprises one or more vinylidene substituted aromatic monomers.

29. The process of Embodiments 27 or 28 wherein the one or more hydrophobic ethylenically unsaturated monomers comprises one or more of styrene or halo or alkyl substituted styrene.

30 The process of any of embodiments 27 to 29, comprising contacting the acid polymer core particles with the first layer of a shell around the polymeric acid core particles with one or more of one or more hydrophobic ethylenically unsaturated monomers, one or more hydrophilic ethylenically unsaturated monomers containing acid functionality and one or more nonionic hydrophilic ethylenically unsaturated monomers, in the presence of an emulsifier and the one or more polymerization initiators in water, wherein the concentration of the one or more hydrophilic ethylenically unsaturated monomers containing acid functionality in the mixture is less than the concentration used to form the first layer of the shell under conditions such that a second layer of the shell is formed about the first layer of the shell around the polymeric acid core particles.

31. The process of Embodiment 30 comprising contacting the polymeric acid core particles with the first layer and the second layer of the shell around the particles with one or more of one or more hydrophobic ethylenically unsaturated monomers, one or more hydrophilic ethylenically unsaturated monomers containing acid functionality and one or more nonionic hydrophilic ethylenically unsaturated monomers in the presence of an emulsifier and the one or more polymerization initiators in water such that a third layer of the shell is formed about the particles with the first and second layers of the shells around the particles wherein the third layer has an acid content less than the acid content in the second layer.

32. The process of Embodiment 27 to 31 comprising contacting the particles with the acid polymer core having one or more layers of the shell with a base in water under conditions such that the polymeric acid core particles absorb water and swell thereby expanding the shell hydraulically.

33. The process of Embodiment 32 wherein the contacting of the particles with the shell around the particles with the one or more hydrophobic ethylenically unsaturated monomers and, optionally one or more hydrophilic ethylenically unsaturated monomers containing acid functionality and/or one or more nonionic hydrophilic ethylenically unsaturated monomers in the presence of an emulsifier and the one or more polymerization initiators in water and contacting the particles with a base in water start at substantially the same time.

34. The process of Embodiment 32 or 33 wherein the contacting of the particles with the shell around the particles with the one or more hydrophobic ethylenically unsaturated monomers and, optionally, one or more hydrophilic ethylenically unsaturated monomers containing acid functionality and/or one or more nonionic hydrophilic ethylenically unsaturated monomers in the presence of an emulsifier and the one or more polymerization initiators in water and contacting the particles with a base in water are performed in a semi-continuous or batch manner.

35. The process of Embodiment 32 to 34 wherein the period for contacting the particles with the shell around the particles with the one or more hydrophobic ethylenically unsaturated monomers and, optionally one or more hydrophilic ethylenically unsaturated monomers containing acid functionality and/or one or more nonionic hydrophilic ethylenically unsaturated monomers in the presence of an emulsifier and the one or more polymerization initiators in water continues after the contacting of the particles with a base in water is stopped.

36. The process of Embodiment 35, comprising contacting the structure comprising the swollen shell with the emulsifier and the one or more polymerization initiators for a period of time sufficient to reduce the amount of unreacted monomers in the formed swollen shell.

37. The process of Embodiment 36 wherein the contacting of the structure comprising the swollen shell with the emulsifier and the one or more polymerization initiators is performed at a temperature of from about 50 to about 110° C.

38. The process of Embodiment 36 or 37 wherein the contacting of the structure comprising the swollen shell with the one or more polymerization initiators is continued until the amount of unreacted monomers is less than about 200 parts per million by weight.

39. The process of any one of Embodiments 33 to 38 wherein the structure is dried and air fills a portion of the volume inside of the shell which does not contain a portion of the dried polymeric acid core.

40. The process of Embodiments 27 to 39 wherein the product formed is a structure comprising the shell having one or more layers surrounding a void, wherein a first shell layer comprises one or more copolymers of the one or more hydrophobic ethylenically unsaturated monomers and, optionally, the one or more hydrophilic ethylenically unsaturated monomers containing acid functionality, and/or one or more nonionic hydrophilic ethylenically unsaturated monomers; wherein in each successive layer the copolymer has a lower percentage of the one or more hydrophilic ethylenically unsaturated monomers containing acid functionality than the previous layer; wherein adjacent to the inner surface of the shell layer is a portion of the dried polymeric acid core and the void is filled with air.

41. The process of any one of Embodiments 27 to 40 wherein the product formed is a structure comprising the shell having three layers surrounding a void, wherein the first shell layer comprises one or more polymers of the one or more hydrophobic ethylenically unsaturated monomers and optionally, one or more hydrophilic ethylenically unsaturated monomers containing acid functionality and/or one or more nonionic hydrophilic ethylenically unsaturated monomers; the second shell layer comprises one or more polymers of, the one or more hydrophobic ethylenically unsaturated monomers and, optionally, the one or more hydrophilic ethylenically unsaturated monomers containing acid functionality and/or one or more nonionic hydrophilic ethylenically unsaturated monomers; the second layer having a lower percentage of the one or more hydrophilic ethylenically unsaturated monomers containing acid functionality than the first layer; and the third layer comprises one or more copolymers of one or more hydrophilic ethylenically unsaturated monomers containing acid functionality, the one or more hydrophobic ethylenically unsaturated monomers and optionally, one or more nonionic hydrophilic ethylenically unsaturated monomers wherein the third layer has a lower concentration of the one or more hydrophilic ethylenically unsaturated monomers containing acid functionality than the second layer; wherein adjacent to the first layer is the dried polymeric acid core and the void is filled with air.

42. The process of Embodiment 41 wherein the resulting product comprises the polymeric acid core having up to 50 percent by weight of the one or more hydrophilic ethylenically unsaturated monomers containing acid functionality, the first shell layer comprises up to about 40 percent by weight of the one or more hydrophilic ethylenically unsaturated monomers containing acid functionality; the second shell layer comprises up to about 25 percent by weight of the one or more hydrophilic ethylenically unsaturated monomers containing acid functionality; and the third layer comprises up to about 5 percent by weight one or more copolymers of one or more hydrophilic ethylenically unsaturated monomers containing acid functionality.

43. The process according to any one of the preceding embodiments wherein the emulsifier present in the acid core formation step is 0 to about 0.05 percent by weight.

44. The process according to any one of the preceding embodiments wherein the mean volume particle sizes of the core, before swelling, are about 100 nm to about 1,000 nm.

45. The process according to any one of the preceding embodiments wherein the emulsifier present in step a is 0 to about 0.05 percent by weight.

46. The process according to any one of the preceding embodiments wherein all of the steps are performed in the same reactor wherein the feed to the reactor is changed for each step.

47. The process according to any one of the previous embodiments wherein one or more of the steps are performed in a separate reactor or zone of a reactor and the feed to that reactor or zone of the reactor is taken from the reactor where the previous step was performed without removal of the particles formed from the reaction mixture of the previous step.

48. A composition prepared by the process of the preceding embodiments.

49. A composition comprising a structure having a shell which surrounds air and a dried polymeric acid core of one or more polymers of one or more hydrophilic ethylenically unsaturated monomers containing acid functionality, one or more nonionic hydrophilic ethylenically unsaturated monomers and, optionally one or more hydrophobic ethylenically unsaturated monomers having up to about 50 percent by weight of the one or more hydrophilic ethylenically unsaturated monomers containing acid functionality, the shell having one or more layers, wherein the layers comprise polymers of one or more of one or more hydrophilic ethylenically unsaturated monomers containing acid functionality, one or more hydrophobic ethylenically unsaturated monomers and one or more nonionic hydrophilic ethylenically unsaturated monomers, wherein the shell layers have up to about 40 percent by weight of the one or more hydrophilic ethylenically unsaturated monomers containing acid functionality; wherein the concentration of the one or more hydrophilic ethylenically unsaturated monomers containing acid functionality decreases from the inside to the outside of the shell, a portion of the dried polymeric acid core is in contact with the inside of the shell and the structure has a mean volume particle diameter of about 200 nm to 2000 nm, the particle size distribution is such that 80 percent of the particles lie within 10 percent of the mean volume particle size and the volume of the void inside the shell is 40 percent or greater.

50. A composition according to claim 49 wherein the particle size is determined from magnified scanning electron microscope pictures wherein the non-collapsed particles are measured and the particle size distribution is calculated from the measured particle sizes.

51. A composition comprising paper or paperboard with a coating disposed on at least one surface wherein the coating comprises a composition according to claim 48 or 49.

ILLUSTRATIVE EMBODIMENTS

The following examples are provided to illustrate the teachings herein and do not limit the scope thereof. All parts and percentages are by weight unless otherwise indicated.

FIG. 1 illustrates the basic steps of the process with the resulting product of each step. Step 1 is the shot growth of a methacrylic acid (MAA) and methyl methacrylate (MMA) to form a copolymer-based polymeric acid core, 101. Step 2 shows the encapsulation of the polymeric acid core 101 with a shell layer, 102. Step 3 shows additional encapsulation of the polymeric acid core (101,102) with a second shell 103. Step 4 is the osmotic expansion of the polymeric acid core forming the polymeric acid core swollen with water 105 by neutralization with base and simultaneous third shell 104 formation, leading to the final particle 106.

Example 1

A 2-liter jacketed glass reactor Is equipped with a pitched blade agitator, thermoelement, nitrogen inlet and reflux condenser. 327.6 grams of deionized water are added to the reactor and heated to 90° C. under a nitrogen atmosphere with the jacket temperature set to 98° C.

Step1: As the acid core monomer shot, a mix is prepared from 35.6 grams methyl methacrylate, 19.6 grams methacrylic acid and 0.3 grams allyl methacrylate. As initial initiator shot, a solution is prepared by dissolving 0.45 grams of sodium persulfate in 17.8 grams of DI water. To the reactor the initial initiator shot is added immediately followed by the acid monomer shot. Both shots last only seconds and cool the reactor contents to 87° C. After 15 minutes the polymeric acid core formation is complete with exotherm increasing the reactor temperature to 94° C. The reaction temperature is maintained at 95° C. through the following steps.

After the formation of the polymeric acid core by shot additions, Step 2, Step 3 and Step 4 are carried out using semi-continuous feed additions. As combined initiator/surfactant stream, a mix is prepared consisting out of 707.5 grams of deionized water, 11.1 grams of a iso-tridecyl alcohol ethoxylate (80%) with 10 EO units, 5.6 grams of sodium di-hexyl sulfosuccinate (80%) and 0.9 grams of sodium persulfate and continuously fed to the reactor over 200 minutes through step 2,3 and 4. For the first encapsulation of the polymeric acid core in step 2 with shell 1, 12.3 grams of styrene and 5.3 grams acrylic acid are mixed and fed to the reactor over 10 minutes. After the first encapsulation of the acid core, a second shell is polymerized in step 3 by feeding a mix of 83.1 grams of styrene and 8.8 grams of methyl methacrylate to the reactor over 50 minutes.

Step 4 starts with polymerization of the remaining shell and the simultaneous osmotic expansion. As a monomer stream 335 grams of styrene is fed to the reactor over 140 minutes. At the same time as the start of the styrene addition, a solution of 18 grams of KOH pellets in 222 grams deionized water are added to the reactor over 30 min. After the end of the styrene addition and the combined initiator/surfactant stream, a post-redox system of 1.9 g t-Butyl Hydroperoxide (70%) dissolved in 222 grams of deionized water and 1.3 grams of disulfate dissolved in 222 grams of deionized water is fed as separate streams for 30 min to the reactor to reduce the residual monomer level.

Figure 2:
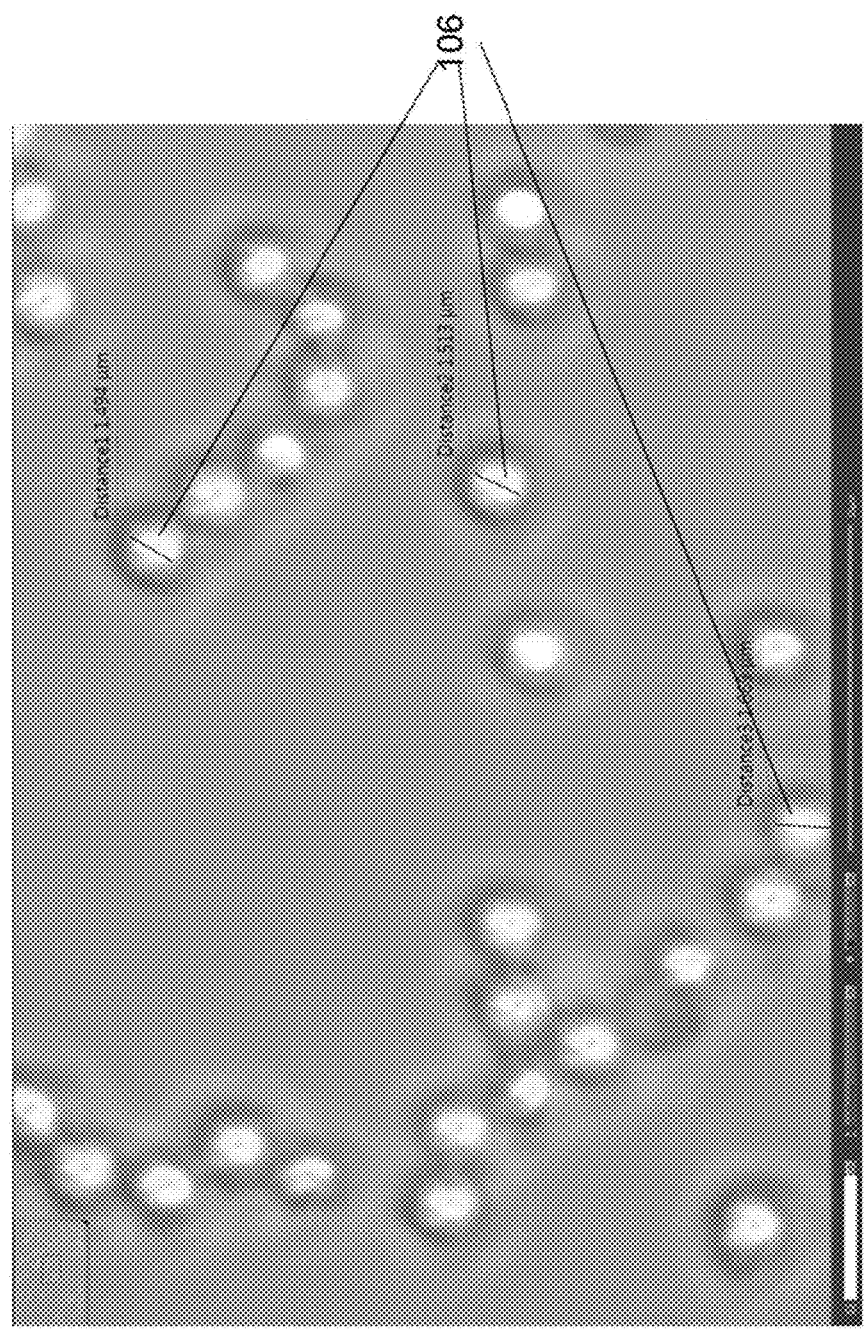
FIG. 2 illustrates a plurality of formed particles, the air voids formed in the hollow particles and the sizes of the particles.
Figure 3:
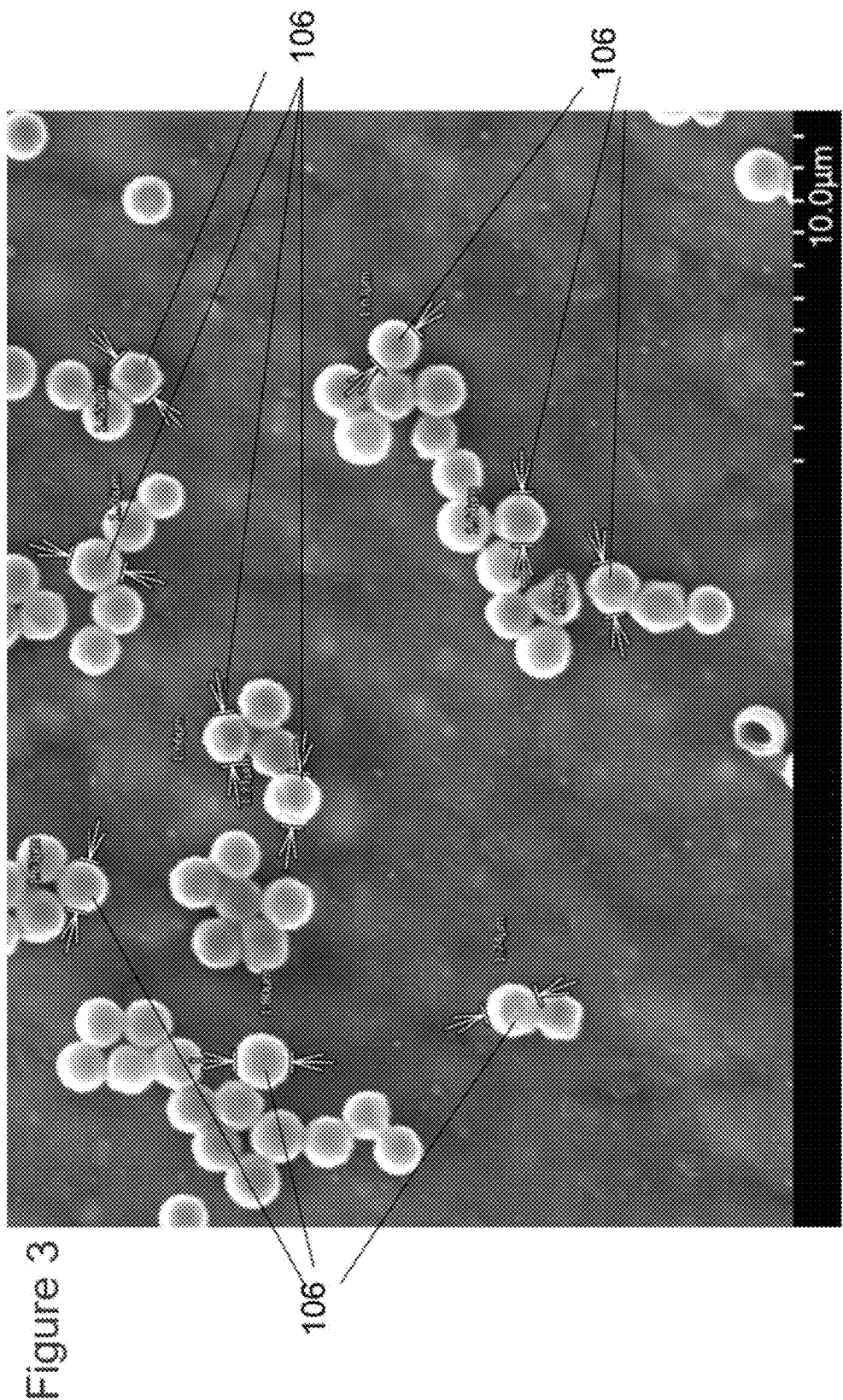
FIG. 3 illustrates size of the hollow latex spheres as measured by scanning electron microscopy.

After the polymerization, a diluted drop of hollow latex is placed on a microscope slide and allowed to dry. After drying, a drop of immersion oil with a refractive index of 1.51 is placed on the dried hollow particles and the examined under an optical microscope. The air voids formed in the hollow latexes can be clearly observed as bright spots in FIG. 2, in particular shown are dried hollow polymeric spheres showing bright air voids under optical microscope with the immersion oil technique. The size of the formed hollow polymeric spheres 106 are shown in FIG. 2. The size of the hollow polymeric spheres 106 is measured by scanning electron microscopy and shown in FIG. 3.

The example demonstrates the production and the uniform particle size control of hollow polymeric spheres by a direct polymerization of polymeric acid core particles, without the need for seed polymer particles. The described shot method is very simple but allows surprisingly a quick and flexible polymerization of uniform polymeric acid core particles with high carboxylation and very low surfactant levels, enabling the production of higher particle sizes.

An example of a barrier coating when applied to a paper or paperboard substrate comprises a synthetic or biobased binder continuous phase containing an optimum range of hollow polymeric sphere pigments of from 10 to 30 weight percent opposite the binder. The binder may be any binder for paper coating known to those skilled in the art.

Example 2

Hollow particles are prepared in a manner similar to that disclosed in Example 1. A portion of the acid core particles are examined for particle size distribution. A portion of the hollow spheres are examined for particle size distribution.

Figure 4:
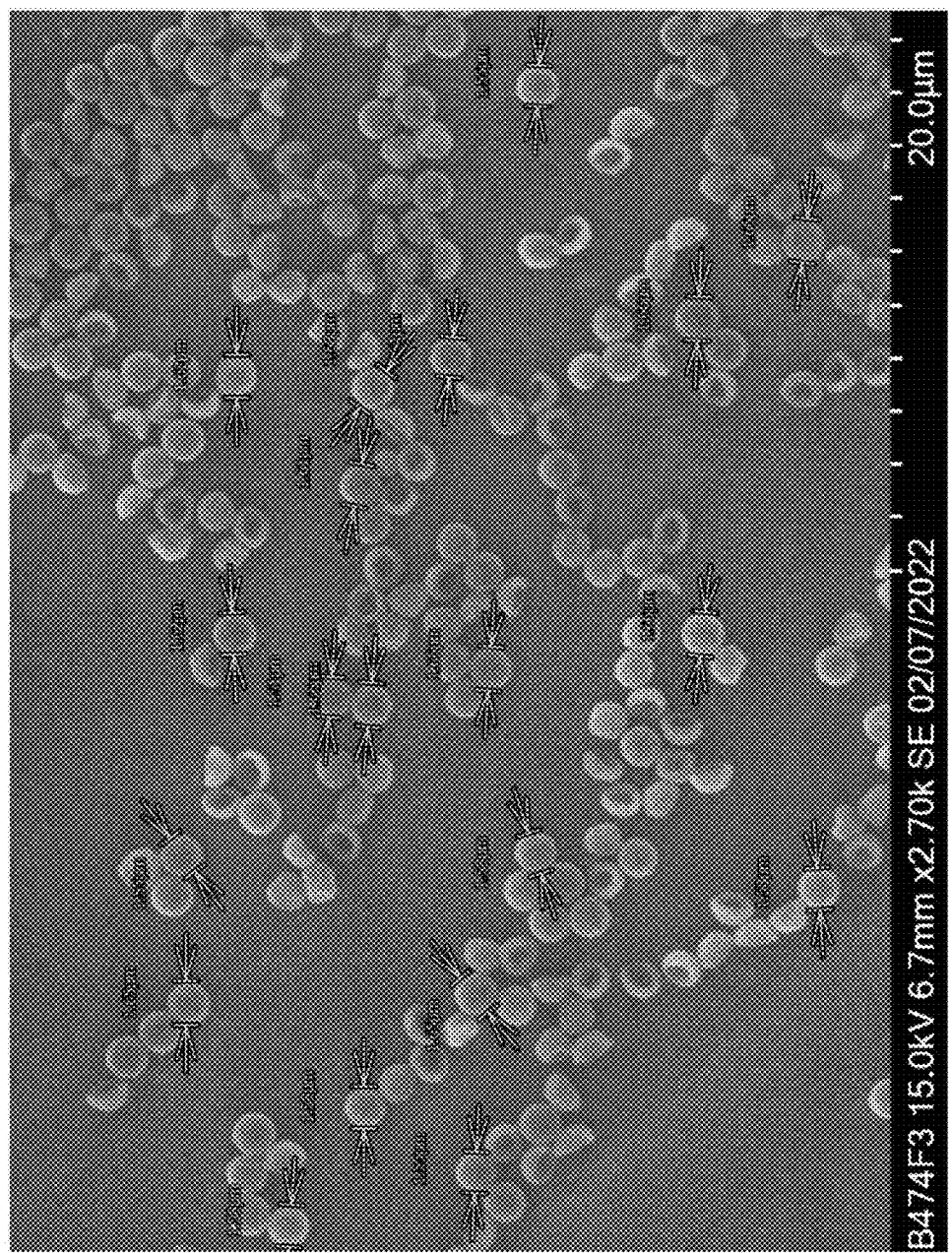
FIG. 4 illustrates size of the hollow latex spheres as measured by scanning electron microscopy.
Figure 5:
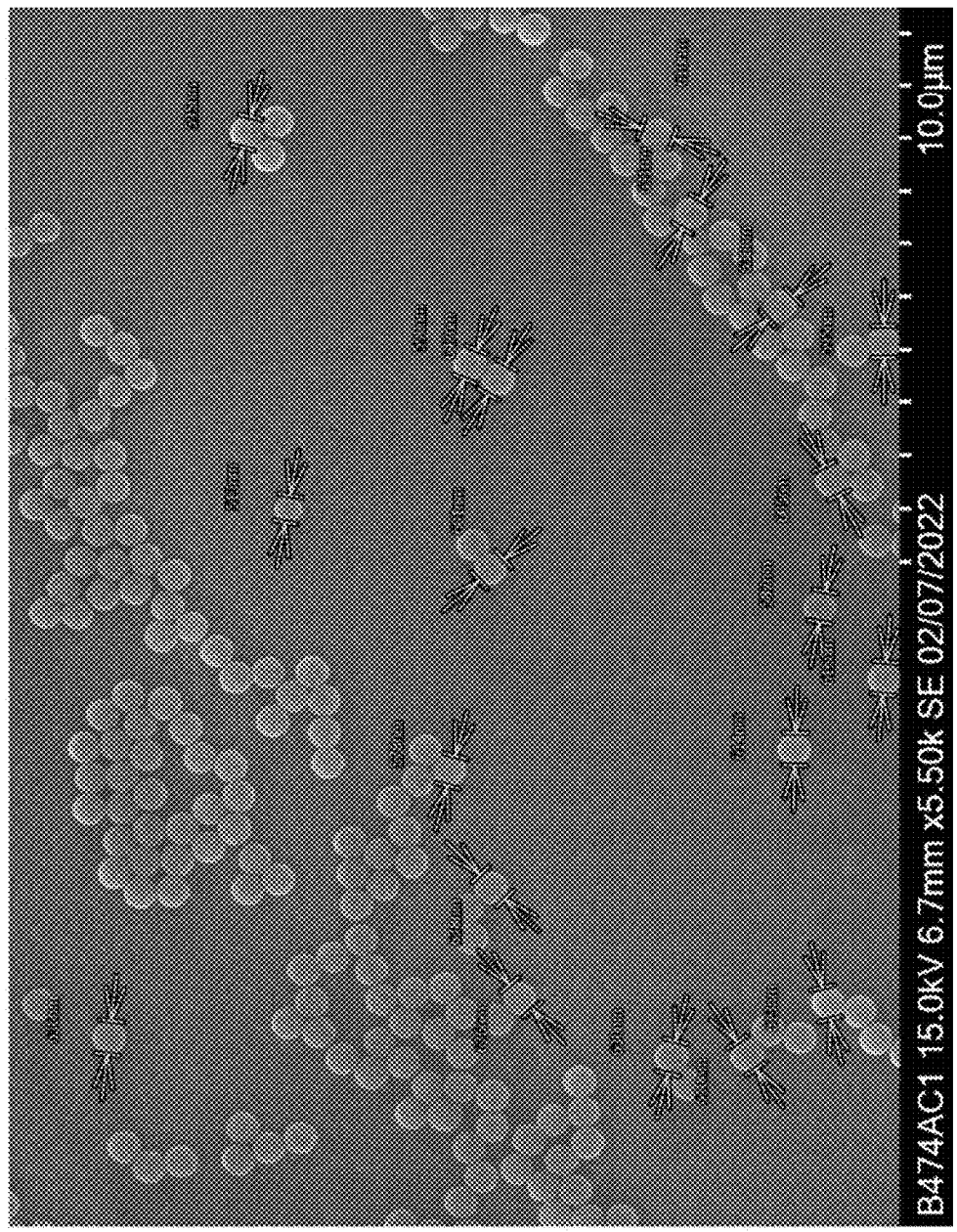
FIG. 5 illustrates size of the acid core particles as measured by scanning electron microscopy.

The acid core particles are examined prior to swelling. The procedure utilized is as follows. The acid core particles and the hollow spheres are dried and examined by scanning electron microscope and pictures are taken. A FlexSEM 1000 is used to generate the particle photos. The magnification level is chosen to allow calculation of the particle sizes of the non-collapsed particles. Diluted samples of acid core and hollow latexes are dried, for example are dried on aluminium foil and sputtered with Platinum under an Argon atmosphere, using a MC1000 Ion Sputter by Hitachi (15 mA, 20 sec). The particle sizes are determined manually by using the FlexSEM 1000 software features. The particle size of each non-collapsed particle is measured and recorded. The distribution is calculated manually. This data is used to calculate span and the mean volume particle size (de Broucker mean, rsp. D[4/3]). The calculation ignores those particles which collapse during the drying step. FIG. 4 is an example of the pictures used to perform the calculation of the volume average size of the hollow spheres. FIG. 5 is an example of the pictures used to perform the calculation the volume average size of the acid core particles. The acid core particles demonstrated Dv10 of 595 nm, a Dv50 of 620 nm and a Dv90 of 650 nm, with a mean volume particle size D[4/3] of 621 nm. The acid core particles demonstrated a span 0.09. The acid core particles showed more than 80 volume percent of the particles within 10 percent of the mean volume particle size. The hollow spheres demonstrated a Dv10 of 1540 nm, a Dv50 of 1640 nm, a Dv90 of 1710 nm and a mean volume particle size D[4/3] of 1632 nm. The hollow spheres demonstrated a span of 0.104. The hollow spheres showed more than 80 volume percent of the particles within 10 percent (i.e. +/−5%) of the mean volume particle size D[4/3].

The invention claimed is:

1. A process comprising:
   a) contacting a mixture of one or more hydrophilic ethylenically unsaturated monomers containing acid functionality, one or more nonionic hydrophilic ethylenically unsaturated monomers and optionally one or more hydrophobic ethylenically unsaturated monomers with water at a temperature of 30° C. or greater and 100° C. or less;
   b) contacting one or more polymerization initiators with the water or with the mixture of a);
   wherein the mixture of monomers is contacted with the water in a single charge and polymeric acid core particles are formed from the mixture of one or more hydrophilic ethylenically unsaturated monomers containing acid functionality, one or more hydrophilic nonionic ethylenically unsaturated monomers, and optionally one or more hydrophobic ethylenically unsaturated monomers: wherein the mixture of monomers is contacted with the water in 60 seconds or less;
   c) contacting the polymeric acid core particles with one or more of one or more hydrophobic ethylenically unsaturated monomers, one or more hydrophilic ethylenically unsaturated monomers containing acid functionality and one or more nonionic hydrophilic ethylenically unsaturated monomers in the presence of the emulsifier and the one or more polymerization initiators in water under conditions such that a layer of a shell is formed around the polymeric acid core particles;
   d) contacting the polymeric acid core particles with the first layer around the particles with one or more of one or more hydrophobic ethylenically unsaturated monomers, one or more hydrophilic ethylenically unsaturated monomers containing acid functionality and one or more nonionic hydrophilic ethylenically unsaturated monomers in the presence of an emulsifier and the one or more polymerization initiators in water such that an outer layer of the shell is formed about the particles with the first layer of the shells around the particles wherein the outer layer has an acid content less than the acid content in the first layer; and
   e) contacting the particles with the acid polymer core and the layers of the shell disposed about the core with a base in water under conditions such that the polymeric acid core particles absorb water and swell thereby expanding the shell hydraulically; and
   wherein the formed structure comprises hollow polymeric spheres dispersed in water.

2. The process of claim 1 comprising contacting the acid polymer core particles with the first layer of a shell around the polymeric acid core particles with one or more of one or more hydrophobic ethylenically unsaturated monomers, one or more hydrophilic ethylenically unsaturated monomers containing acid functionality and one or more nonionic hydrophilic ethylenically unsaturated monomers, in the presence of the emulsifier and the one or more polymerization initiators in water, wherein the concentration of the one or more hydrophilic ethylenically unsaturated monomers containing acid functionality in the mixture is less than the concentration used to form the first layer of the shell under conditions such that a second layer of the shell is formed about the first layer of the shell around the polymeric acid core particles before forming the outer layer.

3. The process of claim 1 wherein the mixture of one or more hydrophilic ethylenically unsaturated monomers containing acid functionality, one or more nonionic hydrophilic ethylenically unsaturated monomers and optionally one or more hydrophobic ethylenically unsaturated monomers is contacted with intimate mixing.

4. The process of claim 1, wherein the one or more hydrophilic ethylenically unsaturated monomers containing acid functionality comprises one or more hydrophilic ethylenically unsaturated monomers containing at least one carboxylic acid group.

5. The process of claim 1, wherein an emulsifier is contacted with the water or the monomer mixture, wherein the emulsifier is a non-ionic emulsifier and/or an anionic emulsifier.

6. The process of claim 1, wherein the one or more polymerization initiators are contacted with the monomer mixture and water in 120 seconds or less.

7. The process of claim 1, wherein the temperature of the monomer mixture and the polymerization initiator is from about 50° C. to about 100° C.

8. The process of claim 1, wherein the polymerization initiator is a water soluble free radical polymerization initiator.

9. The process of claim 1, wherein steps d) and e) start at substantially the same time.

10. The process of any one of claim 1, wherein the structure is dried and air fills a portion of the volume inside of the shell which does not contain a portion of the dried polymeric acid core.

11. The process of claim 1, wherein the period for contacting the particles with the one or two layers of the shell around the particles with the one or more hydrophobic ethylenically unsaturated monomers and, optionally one or more hydrophilic ethylenically unsaturated monomers containing acid functionality and/or one or more nonionic hydrophilic ethylenically unsaturated monomers in the presence of an emulsifier and the one or more polymerization initiators in water to form an outer layer continues after the contacting of the particles with a base in water is stopped.

12. The process of claim 1, comprising contacting the structure comprising the swollen shell with the emulsifier and the one or more polymerization initiators for a period of time sufficient to reduce the amount of unreacted monomers in the hollow polymeric spheres dispersed in water until the amount of unreacted monomers is less than about 200 parts per million by weight.

13. The process according to claim 1, wherein the product formed is a structure comprising the shell having two or three layers surrounding a void, wherein the first shell layer comprises one or more polymers of the one or more hydrophobic ethylenically unsaturated monomers and optionally, one or more hydrophilic ethylenically unsaturated monomers containing acid functionality and/or one or more nonionic hydrophilic ethylenically unsaturated monomers; the optional second shell layer comprises one or more polymers of, the one or more hydrophobic ethylenically unsaturated monomers and, optionally, the one or more hydrophilic ethylenically unsaturated monomers containing acid functionality and/or one or more nonionic hydrophilic ethylenically unsaturated monomers; the second layer having a lower percentage of the one or more hydrophilic ethylenically unsaturated monomers containing acid functionality than the first layer; and the outer layer comprises one or more copolymers of one or more hydrophilic ethylenically unsaturated monomers containing acid functionality, the one or more hydrophobic ethylenically unsaturated monomers and optionally, one or more nonionic hydrophilic ethylenically unsaturated monomers wherein the third layer has a lower concentration of the one or more hydrophilic ethylenically unsaturated monomers containing acid functionality than the second layer; wherein adjacent to the first layer is the polymeric acid core and a void is formed inside the shell, and the structure has an mean volume particle size of 700 nm to 2000 nm, the concentration of residual monomers is 200 parts per million or less and the volume void inside the shell is 40 percent or greater based on the volume of the hollow polymeric spheres.

14. The process according to claim 1, wherein the weight ratio of monomers to water is from 1:4 to 1:20.

15. The process according to claim 13, wherein the mean volume particle size of the core, before swelling, is about 100 nm to about 1000 nm.

16. The process according to claim 1, wherein the emulsifier present in step a is 0 to about 1.0 percent by weight based on total monomer of the final product.

17. The process according to claim 1, wherein all of the steps are performed in the same reactor wherein the feed to the reactor is changed for each step.

18. The process according to claim 1, wherein one or more of the steps are performed in a separate reactor or zone of a reactor and the feed to that reactor or zone of the reactor is taken from the reactor where the previous step was performed without removal of the particles formed from the reaction mixture of the previous step.

19. A composition comprising a structure having a shell which surrounds air and a dried polymeric acid core of one or more polymers of one or more hydrophilic ethylenically unsaturated monomers containing acid functionality, one or more nonionic hydrophilic ethylenically unsaturated monomers and, optionally one or more hydrophobic ethylenically unsaturated monomers having up to about 50 percent by weight of the one or more hydrophilic ethylenically unsaturated monomers containing acid functionality, the shell having one or more layers, wherein the layers comprise polymers of one or more of one or more hydrophilic ethylenically unsaturated monomers containing acid functionality, one or more hydrophobic ethylenically unsaturated monomers and one or more nonionic hydrophilic ethylenically unsaturated monomers, wherein the shell layers have up to about 40 percent by weight of the one or more hydrophilic ethylenically unsaturated monomers containing acid functionality; wherein the concentration of the one or more hydrophilic ethylenically unsaturated monomers containing acid functionality decreases from the inside to the outside of the shell, a portion of the dried polymeric acid core is in contact with the inside of the shell and the structure has a mean volume particle size of about 750 nm to 2000 nm and the volume of the air inside the shell is 40 percent or greater based on the volume of the hollow polymeric spheres, the particle size distribution is such that 90 percent of the particles lie within 10 percent of the volume average particle size and the residual monomer level in the particles is 200 ppm based on weight or less, wherein the particle size is determined from magnified scanning electron microscope pictures wherein the non-collapsed particles are measured and the particle size distribution is calculated from the measured particle sizes.

20. The process according to claim 1 wherein the emulsifier present in step a is 0.01 to about 1.0 percent by weight.

* * * * *

UNITED STATES PATENT AND TRADEMARK OFFICE
CERTIFICATE OF CORRECTION

PATENT NO. : 11,970,599 B2
APPLICATION NO. : 18/280353
DATED : April 30, 2024
INVENTOR(S) : Lothar Martin Page 1 of 1

It is certified that error appears in the above-identified patent and that said Letters Patent is hereby corrected as shown below:

In the Claims

Column 25, Claim 1, Line 59, "the emulsifier" should be —an emulsifier—

Column 26, Claim 1, Line 2, "an emulsifier" should be —the emulsifier—

Column 26, Claim 5, Line 41, "an emulsifier" should be —the emulsifier—

Column 26, Claim 11, Line 67, "an emulsifier" should be —the emulsifier—

Column 27, Claim 13, Line 36, "an mean volume" should be —a mean volume—

Column 27, Claim 14, Line 41, "the weight ratio" should be —a weight ratio—

Signed and Sealed this
Twenty-first Day of January, 2025

Coke Morgan Stewart
*Acting Director of the United States Patent and Trademark Office*